United States Patent
Urata (10) Patent No.: US 9,221,710 B2
(45) Date of Patent: Dec. 29, 2015

(54) GLASS FINE PARTICLE SYNTHESIS BURNER, GLASS FINE PARTICLE DEPOSITION BODY MANUFACTURING METHOD, AND GLASS FINE PARTICLE DEPOSITION APPARATUS

(71) Applicant: Shin-Etsu Chemical Co., Ltd., Tokyo (JP)

(72) Inventor: Yuhei Urata, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 79 days.

(21) Appl. No.: 14/108,190

(22) Filed: Dec. 16, 2013

(65) Prior Publication Data
US 2014/0174135 A1   Jun. 26, 2014

(30) Foreign Application Priority Data
Dec. 21, 2012  (JP) .................................. 2012-279514

(51) Int. Cl.
*C03B 37/014* (2006.01)
(52) U.S. Cl.
CPC ......... *C03B 37/0142* (2013.01); *C03B 2207/06* (2013.01); *C03B 2207/12* (2013.01); *C03B 2207/16* (2013.01); *C03B 2207/18* (2013.01); *C03B 2207/20* (2013.01); *C03B 2207/50* (2013.01)

(58) Field of Classification Search
CPC ............ C03B 2207/06; C03B 2207/12; C03B 2207/20; C03B 2207/50; C03B 2207/18; C03B 2207/16
See application file for complete search history.

(56) References Cited

U.S. PATENT DOCUMENTS

| 2005/0109065 A1* | 5/2005 | Ichii et al. ........................ 65/397 |
| 2006/0096326 A1* | 5/2006 | Saitou et al. ..................... 65/413 |

* cited by examiner

*Primary Examiner* — Queenie Dehghan (57) ABSTRACT

A glass fine particle synthesis burner comprising a glass raw material gas emission path for emitting glass raw material; a ring-shaped combustible gas emission path for emitting combustible gas arranged outside the glass raw material emission path; a ring-shaped combustion aiding gas emission path for emitting combustion aiding gas arranged outside the combustible gas emission path; and small diameter nozzles for emitting the combustion aiding gas within the combustible gas emission path. In a cross section of the glass fine particle synthesis burner formed by cleaving orthogonal to a central axis thereof, when the glass fine particle synthesis burner is divided into two regions by a predetermined straight line passing through a center of the glass fine particle synthesis burner, a total area of the small diameter nozzles in one of the regions is greater than a total area of the small diameter nozzles in the other region.

4 Claims, 7 Drawing Sheets

GLASS FINE PARTICLE SYNTHESIS BURNER, GLASS FINE PARTICLE DEPOSITION BODY MANUFACTURING METHOD, AND GLASS FINE PARTICLE DEPOSITION APPARATUS

The contents of the following Japanese patent applications are incorporated herein by reference:
No. 2012-279514 filed on Dec. 21, 2012.

BACKGROUND

1. Technical Field

The present invention relates to a glass fine particle synthesis burner (referred to hereinafter as the "burner") that is used when manufacturing an optical fiber base material, a method of manufacturing a glass fine particle deposition body (referred to hereinafter as the "soot") using the burner, and a glass fine particle deposition apparatus.

2. Related Art

In the same manner as optical fiber, the center portion of an optical fiber base material has a higher refractive index than the peripheral portion (cladding), and is referred to as the "core." The primary structural component in optical fiber is $SiO_2$, but the core is doped with $GeO_2$ in order to increase the refractive index. In a normal manufacturing method for an optical fiber base material, a soot manufactured using a vapor synthesis technique such as vapor axial deposition (VAD), outer vapor deposition (OVD), or modified chemical vapor deposition (MCVD) is heated and changed into transparent glass.

With VAD, the glass raw material gas such as silicon tetrachloride is combined with glass fine particles as the result of a hydrolytic reaction with an oxyhydrogen flame, the glass fine particles are blown onto and deposited on a rotating starting member, and the starting member is pulled upward to be grown in the axial direction, thereby manufacturing the cylindrical soot.

Figure 1:
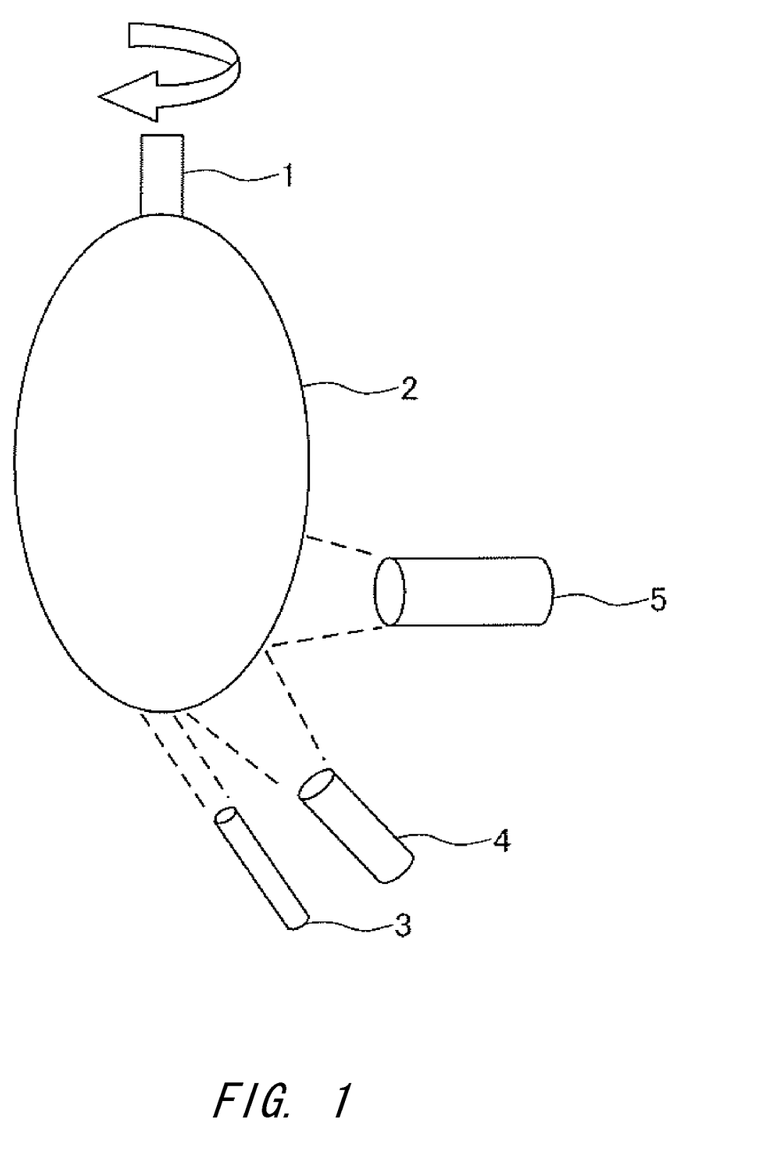
FIG. 1 is a schematic view for describing the state during manufacturing of a glass fine particle deposition body, using a burner.

FIG. 1 shows a state during manufacturing of the soot in which a plurality of burners are used to form the soot 2 by depositing the glass fine particles on the starting member 1. When a plurality of burners are used, a taper is formed on the soot 2 during manufacturing. The core deposition burner 3 forming the core is supplied simultaneously with silicon tetrachloride and a dopant raw material, such as germanium tetrachloride, and is therefore arranged separately from the first cladding deposition burner 4 and the second cladding deposition burner 5. A plurality of burners are often used to manufacture the soot 2. After the core positioned at the center is deposited on the starting member using the core deposition burner 3, the first cladding deposition burner 4 and the second cladding deposition burner 5 arranged thereabove are used to form the cladding that covers the outside. As a result, the portion where deposition is performed gradually gains a thicker diameter, and forms a tapered shape.

Figure 2:
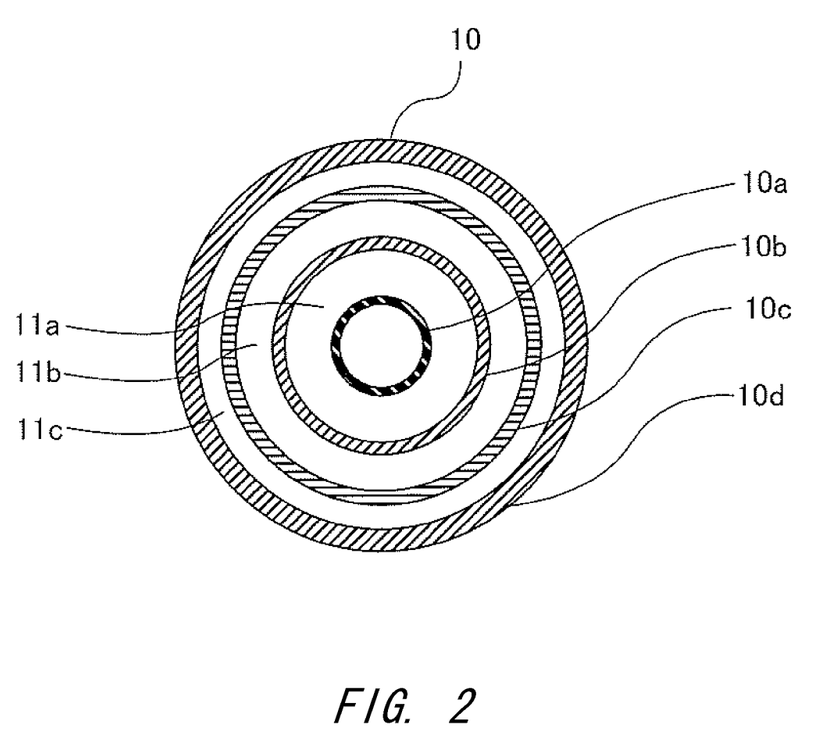
FIG. 2 is a cross-sectional view of a conventional burner.

A variety of structures relating to the shapes of these burners have been proposed and are used. FIG. 2 shows the cross-sectional shape of a conventional burner 10. The burner 10 shown in FIG. 2 is an example in which a plurality of circular tubes with different diameters are arranged concentrically, thereby forming a plurality of ring-shaped gas flow paths. The glass fine particle gas and combustion aiding gas flow through the nozzle of the innermost circular tube 10a of the burner 10. Inert gas as silane gas, hydrogen gas, and combustion aiding gas flow sequentially, in the stated order, through the ring-shaped nozzles 11a to 11c formed by the adjacent circular tubes among the circular tubes 10b to 10d arranged outside the circular tube 10a, to be emitted from the tip.

Figure 3:
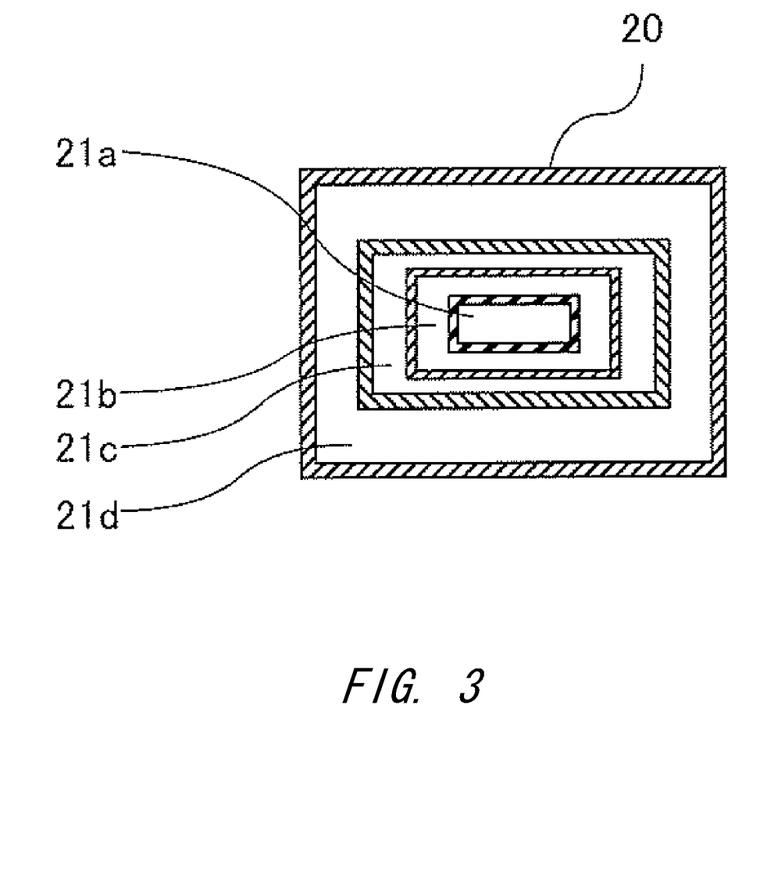
FIG. 3 is a cross-sectional view of another conventional burner.

FIG. 3 shows a cross-sectional state of another conventional burner 20. As shown in FIG. 3, in a rectangular multi-layer tube formed by a plurality of rectangular tubes, beginning from the innermost tube, combustion aiding gas and raw material gas flow through the nozzle 21a, silane gas flows through the nozzle 21b, hydrogen gas flows through the nozzle 21c, and combustion aiding gas flows through the nozzle 21d, and these gasses are emitted from the tip of the burner.

Figure 4:
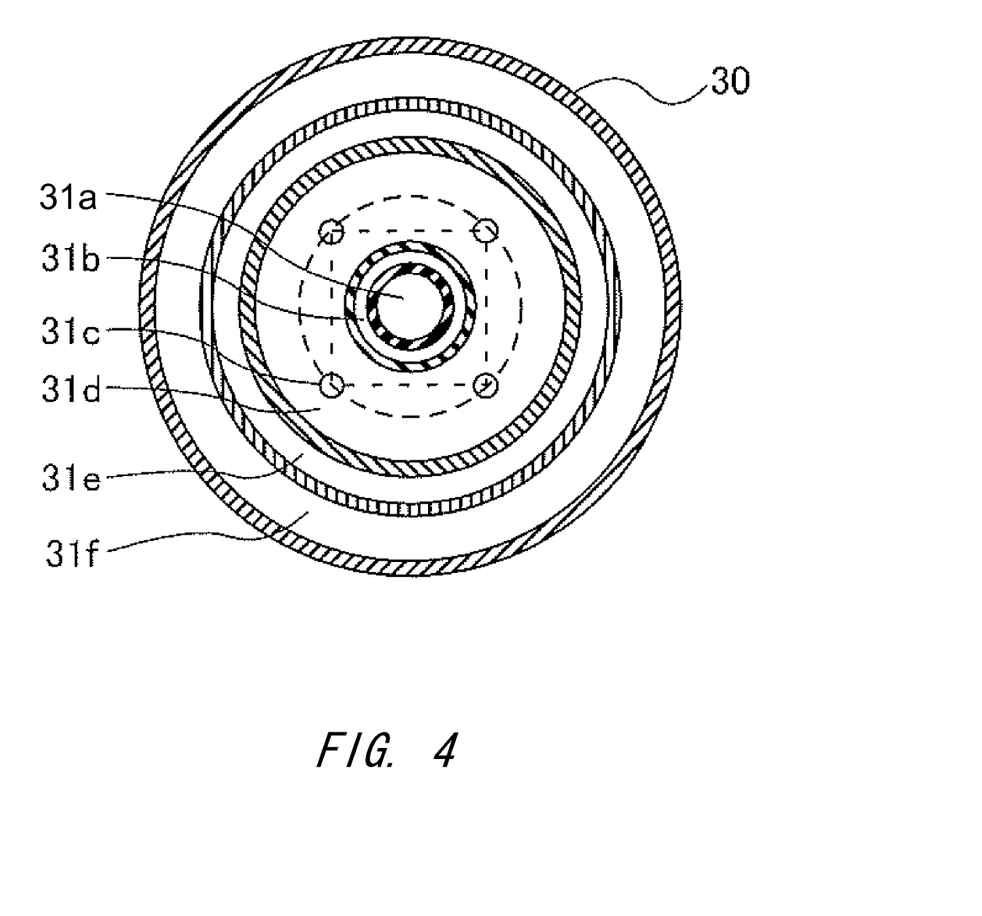
FIG. 4 is a cross-sectional view of another conventional burner.

FIG. 4 shows a cross-sectional state of another conventional burner 30. As shown in FIG. 4, a raw material gas emission flow path is arranged at the center of a circular multilayer tube formed by a plurality of cylinders, and a plurality of supplementary combustion aiding gas emission paths are arranged as a ring within a combustion aiding gas flow path formed to surround the raw material gas flow path, thereby forming a known multi-nozzle burner. The burner 30 includes a nozzle 31a that emits the glass raw material gas and the combustion aiding gas, a plurality of nozzles 31c that emit supplementary combustion aiding gas, and a ring-shaped nozzle 31d that emits hydrogen gas. In addition, the burner 30 includes nozzles 31b and 31e that emit inert gas as silane gas and a nozzle 31f that emits combustion aiding gas.

In recent years, due to advances in drawing techniques, it has become possible to quickly draw large optical fiber base materials. Furthermore, there has been increased worldwide demand for optical fiber, and there is a desire that large-scale optical fiber base material be manufactured in a short time. As shown in FIG. 1, when a plurality of burners are used to efficiently manufacture the soot 2, the burner flame for the cladding deposition contacts the tapered portion of the soot 2. As a result, the upper portion of the flame is emitted toward the thicker portion of the soot 2, and the lower portion of the flame is emitted toward the thinner portion of the soot 2. However, the burners shown in FIGS. 2 to 4 and described above each have a vertically symmetric structure with respect to the central axis of the burner. Therefore, the flame length and flame diameter at the top portion and bottom portion of the burner, the emission rate of the flame, and the like are the same, thereby decreasing the deposition efficiency and making it impossible to perform deposition with a suitable flame on the tapered portion of the soot 2. In order to improve the deposition efficiency, it is essential to realize a suitable flame strength division in combination with the tapered portion of the soot 2, such that the flame emitted toward the thicker portion of the soot 2 is stronger and the flame emitted toward the thinner portion of the soot 2 is weaker.

In light of the above problems, it is an object of the present invention to provide a glass fine particle synthesis burner, a method of manufacturing a glass fine particle deposition body, and a glass fine particle deposition apparatus, which can be used to efficiently deposit glass fine particles even on the tapered portion of soot.

SUMMARY

In order to solve the above problems, according to a first aspect of the present invention, provided is a glass fine particle synthesis burner that is supplied with a glass raw material gas, a combustible gas, and a combustion aiding gas and blows glass fine particles refined in a flame to deposit the glass fine particles on a starting member, the glass fine particle synthesis burner comprising a glass raw material gas emission path for emitting glass raw material; a ring-shaped combustible gas emission path for emitting combustible gas arranged outside the glass raw material emission path; a ring-shaped combustion aiding gas emission path for emitting combustion aiding gas arranged outside the combustible gas emission path; and small diameter nozzles for emitting the combustion aiding gas within the combustible gas emission path. In a cross section of the glass fine particle synthesis burner formed by cleaving orthogonal to a central axis thereof, when the glass fine particle synthesis burner is divided into two regions by a predetermined straight line passing through a center of the glass fine particle synthesis burner, a total area of the small diameter nozzles in one of the regions is greater than a total area of the small diameter nozzles in the other region.

The summary clause does not necessarily describe all necessary features of the embodiments of the present invention. The present invention may also be a sub-combination of the features described above.

DESCRIPTION OF EXEMPLARY EMBODIMENTS

The inventor of the present invention performed a variety of investigations and experiments concerning the flame conditions capable of efficiently depositing glass fine microparticles even on the tapered portion of the soot. As a result, it was found that there is a suitable flame length and flame diameter that depends on the shape of the soot. Further experimentation was performed, and a burner structure was found that achieves the desired flame state, thereby realizing the present invention.

The glass fine particle synthesis burner according to the present embodiment includes a plurality of small diameter nozzles that emit combustion aiding gas within a combustible gas emission path shaped as a ring, which emits combustible gas and is arranged outside the glass raw material emission path that emits the glass raw material. In the cross-sectional view of the burner, the positions at which each small diameter nozzles are arranged within the combustible gas region are asymmetric with respect to the center of the burner, and there is also no rotational symmetry among these positions. Furthermore, in the other glass fine particle synthesis burner according to the present embodiment, the positions at which each of the small diameter nozzles are arranged within the combustible gas region have left-right symmetry with respect to a symmetry line that runs through the center of the burner and divides the burner into left and right portions, and are also asymmetrical with respect to a symmetry line that runs through the center of the burner and divides the burner into top and bottom portions.

Figure 5:
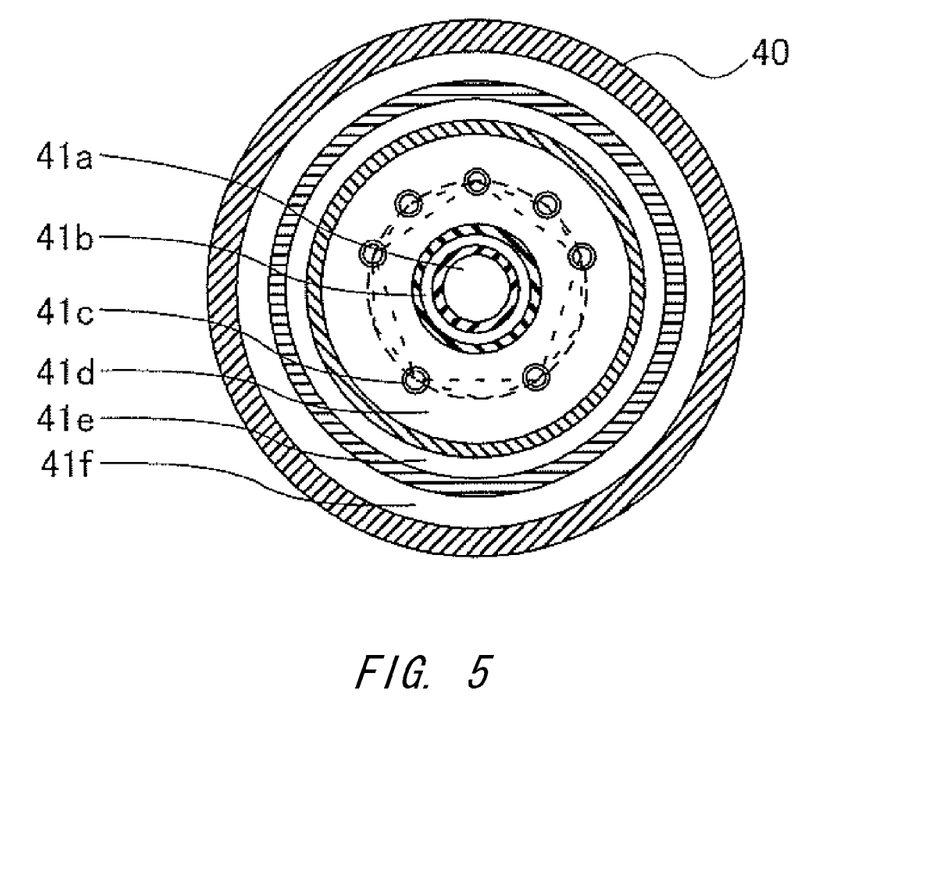
FIG. 5 is a cross-sectional view of the burner according to the present embodiment.

The following describes the embodiments of the present invention, based on the drawings. FIG. 5 is a cross-sectional view of the burner 40 according to the present invention. FIG. 5 is a view of a cross section obtained by vertically cleaving the burner 40 at a central axis, and shows an example of the burner according to the present embodiment. In FIG. 5, in the burner 40, a plurality of quartz glass circular tubes are layered in a stacked manner, and the plurality of small diameter nozzles are arranged in the combustible gas region where the hydrogen gas flows. Oxygen gas and silicon tetrachloride, which is the raw material gas, flow through the central nozzle 41a, silane gas flows through the nozzles 41b to 41e outside the central nozzle, hydrogen gas flows through the nozzle 41d, and oxygen gas flows through the outermost nozzle 41f. In the combustible gas region of the nozzle 41d, a plurality of small diameter nozzles 41c are arranged and oxygen gas flows therethrough.

The burner 40 shown in FIG. 5 differs from a conventional burner in that, in the cross section of the burner, when the burner 40 is divided into two regions by the predetermined straight line passing through the center of the burner, the total area of the small diameter nozzles 41c in one of the regions is greater than the total area of the small diameter nozzles 41c in the other region. In other words, in the example of FIG. 5, the predetermined straight line passes through the center of the burner 40 and is horizontal when the burner 40 is used. When the burner 40 is separated into top and bottom regions by this straight line, the top region has five small diameter nozzles 41c with the same area, and the bottom region has two small diameter nozzles 41c with the same area. Accordingly, the number of small diameter nozzles 41c having the same surface is greater in the top region than in the bottom region, and therefore the total area of small diameter nozzles 41c in the top region is greater than the total area of small diameter nozzles 41c in the bottom region.

Furthermore, in the cross-sectional view of the burner 40 shown in FIG. 5, the positions of the small diameter nozzles arranged in the combustible gas region are asymmetric with respect to the center of the burner and this relationship does not change when the positions are rotated, thereby showing that these positions also do not have rotational symmetry. In other words, in a representative example of a conventional burner, which is shown by the burner 30 of FIG. 4, when rotated by n×90° with the center of this burner serving as the symmetry point, where n is an integer, the small diameter arrangement is still the same as the original arrangement, and this is referred to as having rotational symmetry. With the burner 40 of the present invention shown in FIG. 5, the small diameter nozzle arrangement becomes the original arrangement only when rotated by n×360°, where n is an integer, which means that the burner 40 does not have rotational symmetry.

In this burner 40, the total area of the small diameter nozzles 41c is different in each region resulting from the dividing, and therefore the total amount of combustion aiding gas emitted from the small diameter nozzles 41c is different in each region. When the total amount of combustion aiding gas is different, the strength of the flame emitted from the burner 40 is also different, and therefore the strength of the flame emitted differs according to the region of the burner 40 when this burner 40 is used. As shown in FIG. 1, when using a plurality of burners to manufacture the soot 2 as the soot 2 is pulled upward, the tapered portion is formed in the soot 2 and the top portion becomes thick while the bottom portion becomes thin. The region where the flame of the burner 40 is strong faces the thick portion at the upper end of the soot 2, and the region where the flame is weak faces the thin portion at the lower end of the soot 2. As a result, the thick portion of the soot 2 is strongly heated by the strong flame emitted toward the thick portion of the soot 2, while the thin portion of the soot 2 is weakly heated by the weak flame emitted toward the thin portion of the soot 2. In this way, the strength of the flame can be suitably divided according to the tapered shape of the soot 2.

Figure 6:
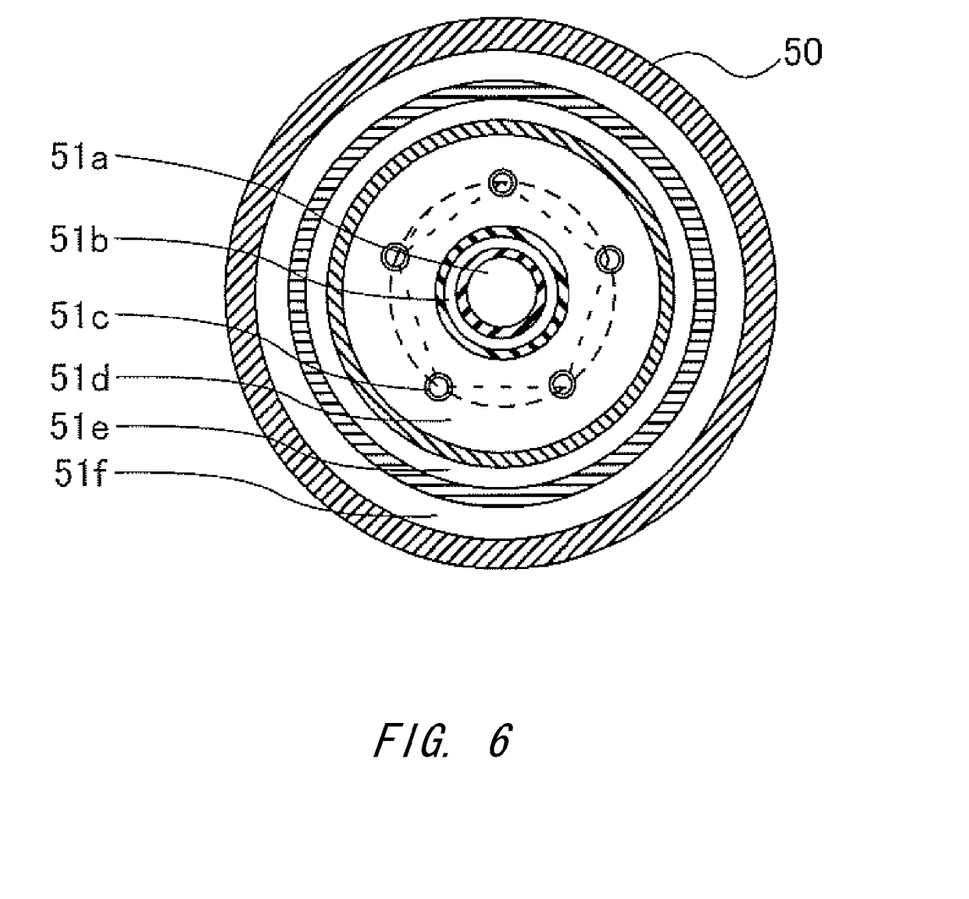
FIG. 6 is a cross-sectional view of another burner according to present embodiment.

FIG. 6 is a cross-sectional view of another burner 50 according to an embodiment of the present invention. In the burner 50 shown in FIG. 6, oxygen gas and silicon tetrachloride, which is the raw material gas, flow through the central nozzle 51a, silane gas flows through the nozzles 51b to 51e outside the central nozzle, hydrogen gas flows through the nozzle 51d, and oxygen gas flows through the outermost nozzle 51f. In the combustible gas region of the nozzle 51d, a plurality of small diameter nozzles 51c are arranged and oxygen gas flows therethrough.

The burner 50 shown in FIG. 6 differs from a conventional burner in that, in the cross section of the burner, when the burner 50 is divided into two regions by the predetermined straight line passing through the center of the burner, the total area of the small diameter nozzles 51c in one of the regions is greater than the total area of the small diameter nozzles 51c in the other region. In other words, in the example of FIG. 6, the predetermined straight line passes through the center of the burner 50 and is horizontal when the burner 50 is used. When the burner 50 is separated into top and bottom regions by this straight line, the top region has three small diameter nozzles 51c with the same area, and the bottom region has two small diameter nozzles 51c with the same area. Accordingly, the number of small diameter nozzles 51c having the same surface is greater in the top region than in the bottom region, and therefore the total area of small diameter nozzles 51c in the top region is greater than the total area of small diameter nozzles 51c in the bottom region.

Furthermore, in the cross-sectional view of the burner 50 shown in FIG. 6, the positions of the small diameter nozzles 51c arranged in the combustible gas region have left-right symmetry with respect to a symmetry line through the center of the burner dividing the burner into left and right portions. Furthermore, in the burner 50 shown in FIG. 6, the small diameter nozzles 51c are asymmetric with respect to a symmetry line that passes through the burner and divides the burner into top and bottom portions.

In this burner 50 as well, the total area of the small diameter nozzles 51c is different in each region resulting from the dividing, and therefore the total amount of combustion aiding gas emitted from the small diameter nozzles 51c is different in each region. When the total amount of combustion aiding gas is different, the strength of the flame emitted from the burner 50 is also different, and therefore the strength of the flame emitted differs according to the region of the burner 50 when this burner 50 is used. As shown in FIG. 1, when using a plurality of burners to manufacture the soot 2 as the soot 2 is pulled upward, the tapered portion is formed in the soot 2 and the top portion becomes thick while the bottom portion becomes thin. The region where the flame is strong faces the thick portion at the upper end of the soot 2, and the region where the flame is weak faces the thin portion at the lower end of the soot 2. As a result, the thick portion of the soot 2 is strongly heated by the strong flame emitted toward the thick portion of the soot 2, while the thin portion of the soot 2 is weakly heated by the weak flame emitted toward the thin portion of the soot 2. In this way, the strength of the flame can be suitably divided according to the tapered shape of the soot 2.

First Embodiment

Using VAD, the burner 40 shown in FIG. 5 was used, as a second cladding deposition burner, along with the core deposition burner 3 and the first cladding deposition burner 4, and these three burners where used to manufacture a soot. In the burner 40, the region having the greater total area for the small diameter nozzles 41c, i.e. the region where five of the small diameter nozzles 41c are arranged, was oriented to be the top region. Therefore, as shown in FIG. 1, the top region of the burner 40 faced the thick portion of the soot, while the bottom region of the burner 40 faced the thin portion of the soot. Using this glass fine particle deposition apparatus, the soot was manufactured using the following conditions.

Silicon tetrachloride with a flow rate of 3.5 L/min and oxygen with a flow rate of 2.5 L/min flowed through the nozzle 41a of the second cladding deposition burner, i.e. the burner 40, hydrogen with a flow rate of 45 L/min flowed through the nozzle 41d, oxygen with a flow rate of 20 L/min flowed through the nozzle 41f, and oxygen with a flow rate of 4.0 L/min in total flowed through the small diameter nozzles 41c. On the other hand, oxygen with a flow rate of 7.5 L/min, hydrogen with a flow rate of 5.0 L/min, argon with a flow rate of 0.4 L/min, and silicon tetrachloride with a flow rate of 0.30 L/min flowed through the core deposition burner. Oxygen with a flow rate of 14 L/min, hydrogen with a flow rate of 14 L/min, argon with a flow rate of 2.2 L/min, and silicon tetrachloride with a flow rate of 0.80 L/min flowed through the first cladding deposition burner. As a result of the manufacturing with the above conditions, the overall average deposition rate was 8.0 g/min and the yield was 71%. The case of 100% yield was calculated based on deposition including completely hydrolyzing the silicon tetrachloride at a rate of 31.8 g/min and generating silicon dioxide at a rate of 11.2 g/min.

Second Embodiment

Using VAD again, the burner 50 shown in FIG. 6 was used, as a second cladding deposition burner, along with the core deposition burner 3 and the first cladding deposition burner 4, and these three burners where used to manufacture a soot. In the burner 50, the region having the greater total area for the small diameter nozzles 51c, i.e. the region where three of the small diameter nozzles 51c are arranged, was oriented to be the top region. Therefore, as shown in FIG. 1, the top region of the burner 50 faced the thick portion of the soot, while the bottom region of the burner 50 faced the thin portion of the soot. The gas flow rate for each nozzle in each burner was the same as in the first embodiment. As a result of the manufacturing with the above conditions, the overall average deposition rate was 7.7 g/min and the yield was 69%.

First Comparative Example

Using VAD, the burner 30 shown in FIG. 4 was used, as a second cladding deposition burner 5, along with the core deposition burner 3 and the first cladding deposition burner 4, and these three burners where used to manufacture a soot. The gas flow rate for each nozzle in each burner was the same as in the first embodiment. As a result of the manufacturing with the above conditions, the overall average deposition rate was 6.7 g/min and the yield was 60%.

Second Comparative Example

Figure 7:
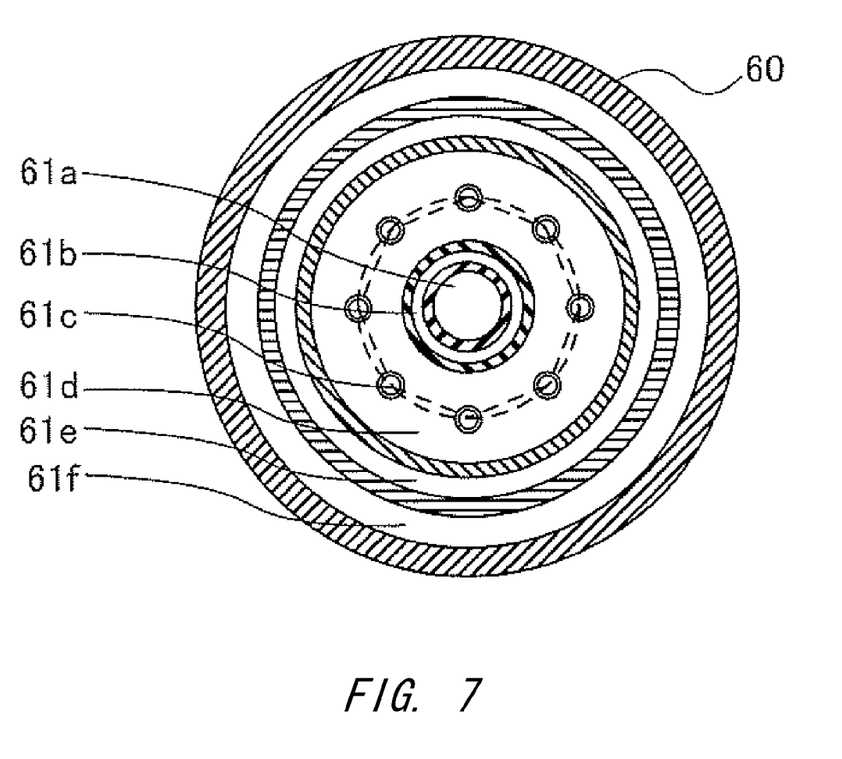
FIG. 7 is a cross-sectional view of the burner used in the second comparative example.

FIG. 7 shows a cross section of the burner 60 used in the second comparative example. Using VAD, the burner 60 shown in FIG. 7 was used, as a second cladding deposition burner 5, along with the core deposition burner 3 and the first cladding deposition burner 4, and these three burners where used to manufacture a soot. The gas flow rate for each nozzle in each burner was the same as in the first embodiment. As a result of the manufacturing with the above conditions, the overall average deposition rate was 6.9 g/min and the yield was 62%.

As shown above, the overall average deposition rate is 8.0 g/min in the first embodiment and 7.7 g/min in the second embodiment, and these are both higher than the overall average deposition rate of 6.7 g/min in the first comparative example and 6.9 g/min in the second comparative example serving as examples of conventional burners. Furthermore, the soot manufacturing yield is 71% in the first embodiment and 69% in the second embodiment, and these are both higher than the soot manufacturing yield of 60% in the first comparative example and 62% in the second comparative example serving as examples of conventional burners. In this way, with the present invention, deposition can be performed with a suitable flame diameter and flame length for the shape of the soot. As a result, the deposition rate of the soot can be increased, and the soot manufacturing yield can be greatly increased. In this way, by using the burner 40 or the burner 50 shown in the above embodiments or by using the glass fine material deposition method and glass fine particle deposition apparatus including the burner 40 or burner 50, the soot can be manufactured efficiently and a large optical fiber base material can be manufactured in a short time.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A glass fine particle synthesis burner that is supplied with a glass raw material gas, a combustible gas, and a combustion aiding gas and blows glass fine particles refined in a flame to deposit the glass fine particles on a starting member, the glass fine particle synthesis burner comprising:
    a glass raw material gas emission path for emitting glass raw material;
    a ring-shaped combustible gas emission path for emitting combustible gas arranged outside the glass raw material emission path;
    a ring-shaped combustion aiding gas emission path for emitting combustion aiding gas arranged outside the combustible gas emission path; and
    small diameter nozzles for emitting the combustion aiding gas within the combustible gas emission path, wherein
    in a cross section of the glass fine particle synthesis burner formed by cleaving orthogonal to a central axis thereof, when the glass fine particle synthesis burner is divided into two regions by a predetermined straight line passing through a center of the glass fine particle synthesis burner, a total area of the small diameter nozzles in one of the regions is greater than a total area of the small diameter nozzles in the other region, and
    in the cross section of the glass fine particle synthesis burner formed by cleaving vertically through the central axis thereof, positions of the small diameter nozzles arranged within a combustible gas region do not have rotational symmetry such that the positions of the small diameter nozzles become the original positions only when the glass fine particle synthesis burner is rotated by n×360°, where n is an integer.

2. The glass fine particle synthesis burner according to claim 1, wherein
    the small diameter nozzles each have the same area, and the number of small diameter nozzles in the one region is greater than the number of small diameter nozzles in the other region.

3. The glass fine particle synthesis burner according to claim 2, wherein
    in the cross section of the glass fine particle synthesis burner formed by cleaving vertically through the central axis thereof, the positions of the small diameter nozzles arranged within a combustible gas region have left-right symmetry with a line passing through the center of the glass fine particle synthesis burner and dividing the glass fine particle synthesis burner into left and right regions serving as a symmetry line, and are asymmetric with a line passing through the center of the glass fine particle synthesis burner and dividing the glass fine particle synthesis burner into top and bottom regions serving as a symmetry line.

4. A method of manufacturing a glass fine particle deposition body, comprising:
    emitting glass raw material via a glass raw material gas emission path of a glass fine particle synthesis burner having the glass raw material gas emission path, a ring-shaped combustible gas emission path arranged outside the glass raw material emission path, a ring-shaped combustion aiding gas emission path arranged outside the combustible gas emission path, and small diameter nozzles within the combustible gas emission path;
    emitting combustible gas via the ring-shaped combustible gas emission path of the glass fine particle synthesis burner;
    emitting combustion aiding gas via the ring-shaped combustion aiding gas emission path of the glass fine particle synthesis burner; and
    emitting the combustion aiding gas via the small diameter nozzles of the glass fine particle synthesis burner, wherein
    in a cross section of the glass fine particle synthesis burner formed by cleaving orthogonal to a central axis thereof, when the glass fine particle synthesis burner is divided into two regions by a predetermined straight line passing through a center of the glass fine particle synthesis burner, a total area of the small diameter nozzles in one of the regions is greater than a total area of the small diameter nozzles in the other region, and
    in the cross section of the glass fine particle synthesis burner formed by cleaving vertically through the central axis thereof, positions of the small diameter nozzles arranged within a combustible gas region do not have rotational symmetry such that the positions of the small diameter nozzles become the original positions only when the glass fine particle synthesis burner is rotated by n×360°, where n is an integer.

* * * * *